United States Patent
Burgess

(10) Patent No.: US 9,562,570 B2
(45) Date of Patent: Feb. 7, 2017

(54) SAFETY GUARD FOR POWER TAKE OFF

(71) Applicant: SPAREX LIMITED, Hesston, KS (US)

(72) Inventor: Jeremy Burgess, Rugby (GB)

(73) Assignee: SPAREX LIMITED, Exeter (GB)

( * ) Notice: Subject to any disclaimer, the term of this patent is extended or adjusted under 35 U.S.C. 154(b) by 0 days.

(21) Appl. No.: 14/654,027

(22) PCT Filed: Dec. 11, 2013

(86) PCT No.: PCT/EP2013/076205
§ 371 (c)(1),
(2) Date: Jun. 19, 2015

(87) PCT Pub. No.: WO2014/095515
PCT Pub. Date: Jun. 26, 2014

(65) Prior Publication Data
US 2015/0316109 A1    Nov. 5, 2015

(30) Foreign Application Priority Data

Dec. 21, 2012 (GB) .................................. 1223548.7

(51) Int. Cl.
*F16D 3/84* (2006.01)
(52) U.S. Cl.
CPC ...................................... *F16D 3/841* (2013.01)
(58) Field of Classification Search
CPC ...................................................... F16D 3/841
USPC ......... 464/171, 172, 178; 74/11, 502.4, 609; 403/23; 411/522, 523; 24/DIG. 28; 384/539, 384/585
See application file for complete search history.

(56) References Cited

U.S. PATENT DOCUMENTS

| | | | | |
|---|---|---|---|---|
| 1,038,664 A | * | 9/1912 | Schell | F16B 37/02 411/523 X |
| 2,021,241 A | | 11/1935 | Mall | |
| 2,772,550 A | | 12/1956 | Harrington | |
| 3,527,485 A | | 9/1970 | Goward et al. | |
| 4,747,804 A | * | 5/1988 | Benzi | F16D 3/841 403/23 |
| 5,161,428 A | * | 11/1992 | Petruccello | F16C 1/226 74/502.4 X |

FOREIGN PATENT DOCUMENTS

| | | |
|---|---|---|
| DE | 8809414 U1 | 9/1988 |
| EP | 0347389 A2 | 12/1989 |
| FR | 2 691 766 A1 * | 12/1993 |
| GB | 2076490 A | 12/1981 |

OTHER PUBLICATIONS

European Patent Office/ISA, International Search Report for International Patent Application No. PCT/EP2013/076205, mailing date of Mar. 13, 2014.

* cited by examiner

*Primary Examiner* — Gregory Binda

(57) ABSTRACT

A safety guard for a power take off (PTO) shaft including a guard body for positioning over the PTO shaft, and a U-shaped locking clip. The clip is slidable in a radial direction with respect to the PTO shaft, between the locked and unlocked positions. The locking clip includes a pair of locking portions that each extend into an annular groove present on the PTO shaft or present on a guard bearing member mounted to the PTO shaft when the locking member is in the locked position to prevent axial displacement of the guard body relative to the PTO shaft.

7 Claims, 4 Drawing Sheets

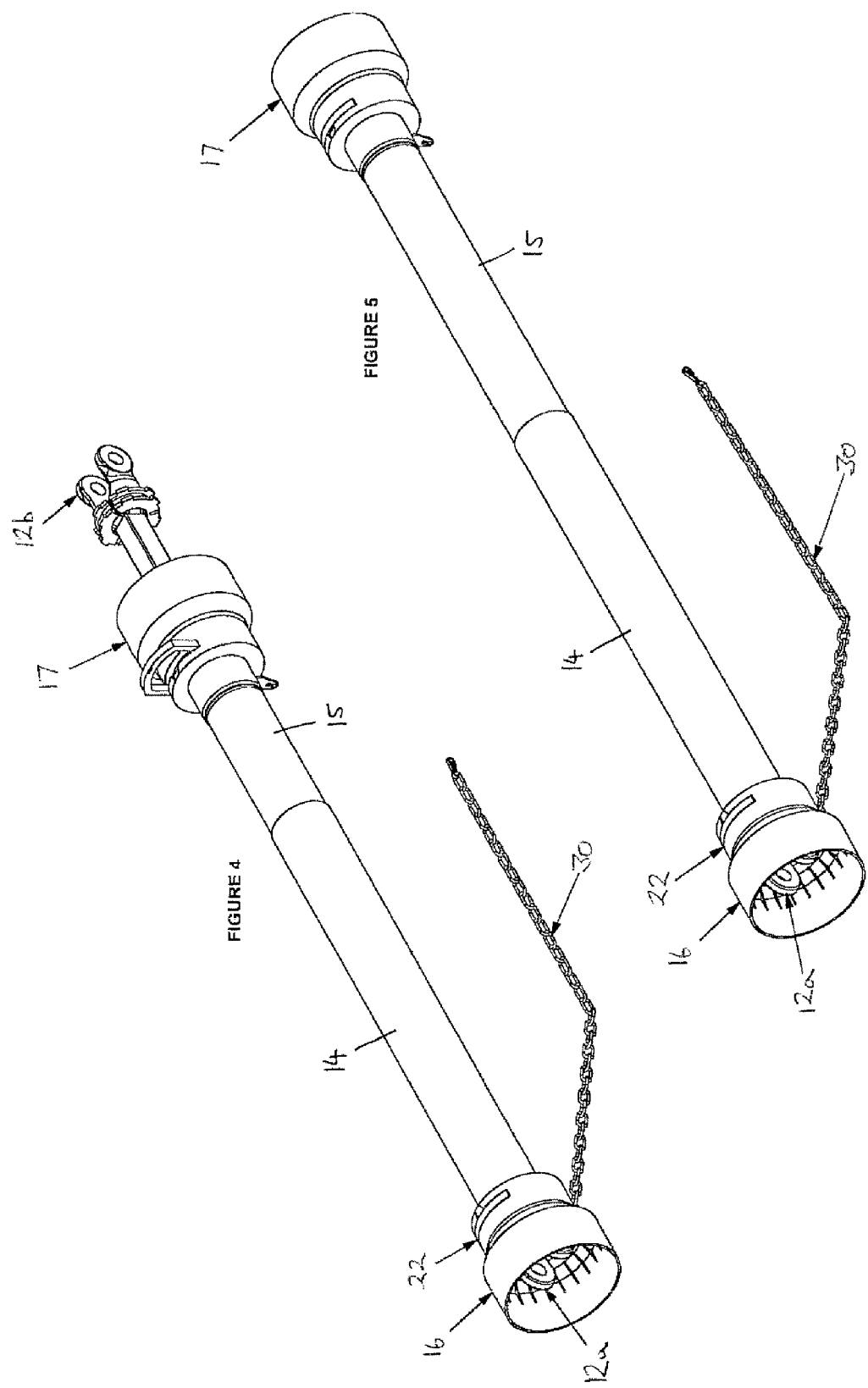

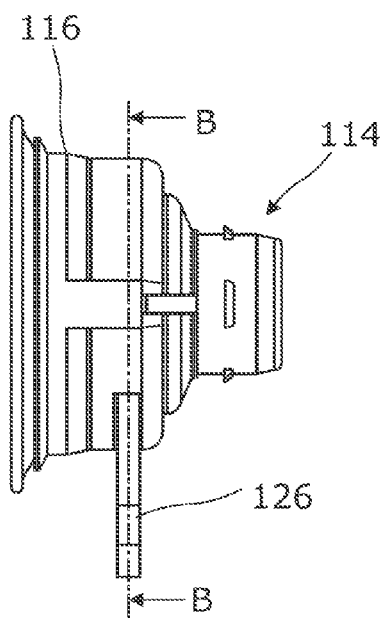
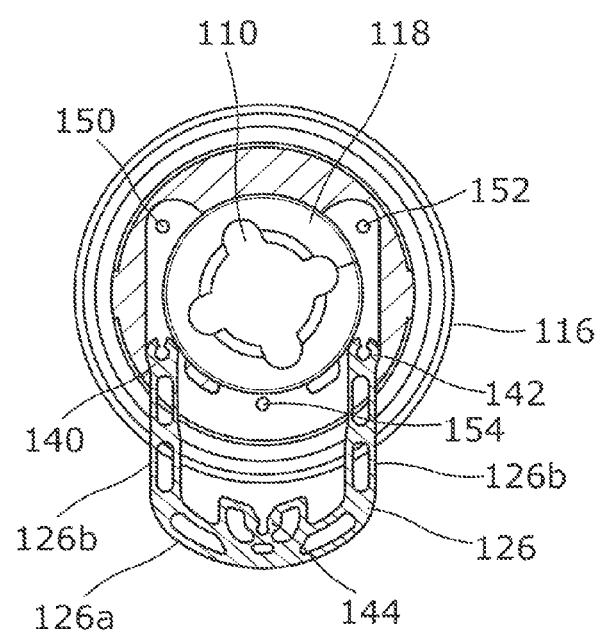
FIG. 6A
FIG. 6B
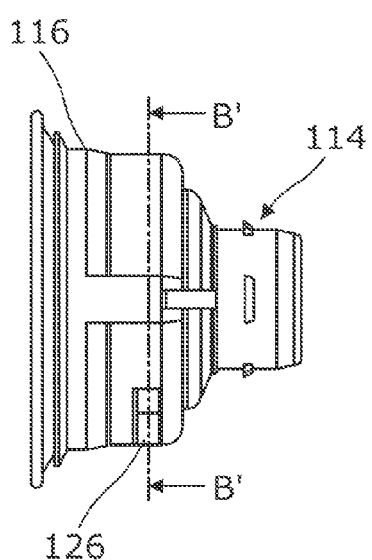
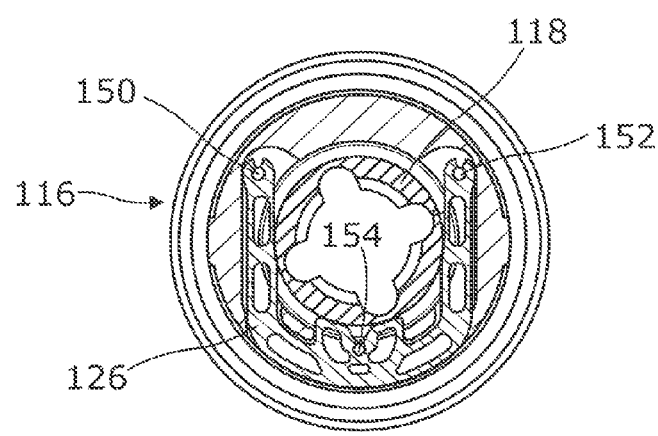
FIG. 7A
FIG. 7B

SAFETY GUARD FOR POWER TAKE OFF

TECHNICAL FIELD

The invention relates to a safety guard. The safety guard is especially suited for use with a power take off (PTO) of an agricultural tractor, harvester or implement. However it will be appreciated that the safety guard may also be used to cover any other rotating shaft or rotating joint.

BACKGROUND

Safety legislation in many western jurisdictions requires that PTO shafts and their connecting members are covered by a guard which reduces the risk of injury for the operator. Guards fitted to the PTO shafts of agricultural equipment are typically formed of a plastic material and comprise a tube with enlarged end portions to accommodate the coupling mechanism. A short length of chain is usually employed to attach the guard to a fixed structure which prevents rotation. To minimize wear of the plastic guard, a guard bearing is often fitted to the PTO shaft to allow the shaft and guard to rotate with respect to one another. Furthermore, to prevent axial movement of the guard relative to the shaft, a means of securing the guard to the bearing member or shaft is often provided in the form of a releasable clip.

United Kingdom patent application GB-2,427,009 discloses a safety guard for a PTO with a releasable locking mechanism which comprises a pair of pivoting levers which releaseably engage a groove on a guard bearing mounted to the PTO shaft. Each lever is manually operated between a locked and an unlocked position.

SUMMARY OF INVENTION

It is an object of the invention to provide an alternative locking mechanism for a PTO safety guard which includes fewer components and which can be manufactured at a reduced cost.

According to the invention there is provided a safety guard for a power take off comprising a guard body for positioning over the PTO shaft, and a U-shaped locking clip being slidable in a radial direction with respect to the PTO shaft between a locked position and an unlocked position, the locking clip comprising a pair of locking portions that each extend into an annular groove present on the PTO shaft or present on a guard bearing member mounted to the PTO shaft when the locking member is in the locked position to prevent axial displacement of the guard body relative to the PTO shaft.

The U-shaped locking clip provides a simple releasable locking mechanism which is cheap to manufacture. Alternatively termed a horseshoe clip, the U-shaped locking clip can be simply slid manually downwards through a slot in the guard body so that the locking portions extend into the annular groove thus preventing axial movement of the guard. The locking mechanism can be simply released by lifting the U-shaped clip upwardly to overcome the resilience of the locking portions and thus separate them from the groove.

A slot is preferably provided in the guard body to receive the locking clip. The slot may be substantially rectangular.

The locking clip may be retained in the annular groove by a flexing tang disposed on one of the locking clip and guard bearing member, the tang engaging an edge provided on the other of the locking clip and guard bearing member when in the locked position. In a preferred embodiment the locking clip comprises a pair of tangs at the ends thereof, each tang engaging an edge of a recess formed into an inside surface of the guard body when in the locked position to inhibit removal of the locking clip therefrom. When unlocking is required an operator may simply use a tool (such as a screwdriver) to lever the tangs away from the said edge before pulling the locking clip upwardly and away from the guard body.

The tangs may be simply included in the overall profile of the locking clip and thus provided with no additional manufacturing steps or components.

Alternatively, the locking clip may be retained by at least one clamp-type clip having a deformable jaw disposed on one of the locking clip and guard bearing member, the at least one clamp-type clip snap fitting onto a respective pin fixed to the other of the locking clip and guard bearing member. In another preferred embodiment the locking clip comprises at least one clamp-type clip that snap fits on a pin that extends in the direction of the PTO shaft axis. The resilience of the clamp-type clips retain the locking clip in place. Removal of the locking clip simply requires pulling to overcome the resilience of the clamp-type clips. The locking clip preferably comprises three clamp-type clips wherein one is provided at each of end of the locking clip and a third is provided in the centre of a central section of the locking clip.

The locking clip may comprise a curved central portion and two straight leg portions, each leg portion comprising a respective locking portion. The curved central portion preferably has a curvature which substantially matches the exterior profile of the guard body so that the outside surface of the locking clip is flush therewith when in the locked position. Alternatively, the locking clip may be more circular in shape and resemble more of a horseshoe shape. Advantageously, a more curved profile may increase the size of the locking portion.

BRIEF DESCRIPTION OF DRAWINGS

Further advantages of the invention will be apparent from reading the following description of specific embodiments with reference to the appended drawings in which:

FIG. 4 shows a perspective view of the safety guard of FIG. 3 showing the furthest U-shaped clip in the unlocked position;

FIG. 5 shows a perspective view of the safety guard of FIG. 3 showing the respective clips in the locked position; and, FIGS. 6A and 7A each show a side view and FIGS. 6B and 7B, a vertical section of an end portion of a safety guard in accordance with a second embodiment of the invention with FIG. 6A showing the locking clip in the unlocked position and FIG. 7A showing the locking clip in the locked position, the vertical section shown in FIG. 6B is viewed along the line B-B of FIG. 6A and the vertical section shown in FIG. 7B is viewed along the line B'-B' of FIG. 7A.

DETAILED DESCRIPTION OF SPECIFIC EMBODIMENTS

Figure 3:
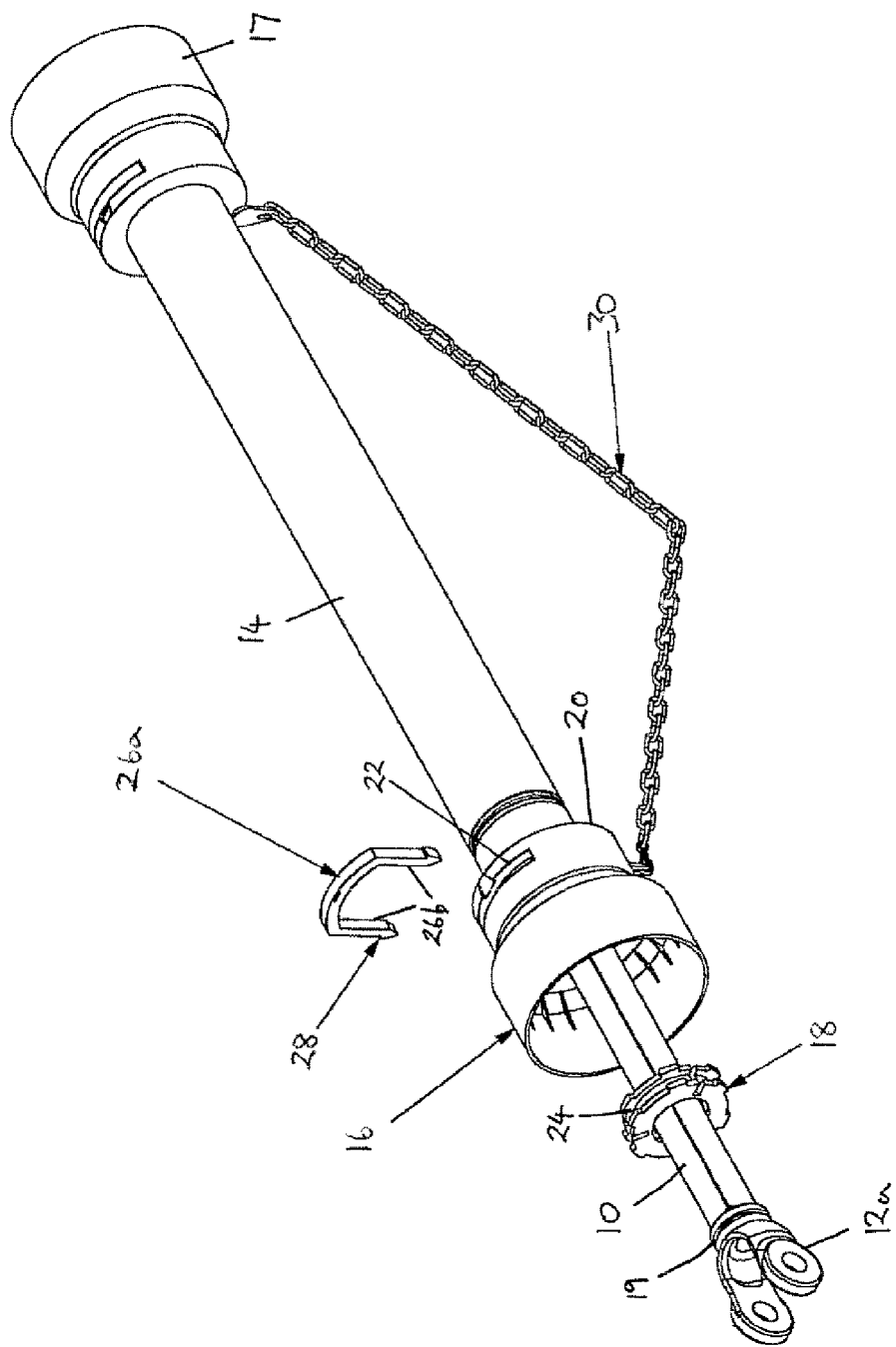
FIG. 3 is a perspective view of the safety guard showing the clip in exploded form together with the PTO shaft and guard bearing member.

With reference to FIG. 3 a PTO shaft 10 comprises two telescopic sections, each comprising a yoke 12a,12b which forms part of a universal joint. Each universal joint includes a coupling mechanism (not shown) which is well known in the art and used to releaseably attach each end of the PTO shaft 10 to splined input/output stubs. For example these stubs may be an output stub on the rear of a tractor and an input stub on an attached implement such as a baler. The design and use of PTO shafts is well known and will not be described in any detail hereinafter.

Each section of the PTO shaft 10 includes a respective safety guard 14,15. Each safety guard 14,15 includes a tubular portion which surrounds the shaft 10 and an enlarged end portion 16,17 which covers the respective yokes 12a, 12b and the associated coupling mechanisms. The two safety guards 14,15 are similar in construction but the tubular portion of first guard 14 is slightly larger than that of second guard 15 to allow the two guards 14,15, to slide telescopically with respect to one another. It shall be understood, as is known in the art, that the guards can, therefore, telescope with respect to one another as the two sections of the shaft 10 also telescope for lengthwise adjustment. It should be understood that whilst the following description relates to one part of the safety guard 14, the second part of the safety guard 15 is constructed in a similar manner.

As is known, a nylon guard bearing member 18 is provided on the power take off shaft 10 and serves as a bearing between the shaft 10 and the guard body 14. The guard bearing member 18 is snap fitted onto the end of yoke 12a wherein a groove 19 is provided for this purpose. Starting from the disassembled situation shown in FIG. 3 the guard body 14 is slid axially over the shaft 10 until a shoulder 20 of the enlarged body portion 16 abuts the bearing member 18. At this point the rectangular slot 22 provided in the guard body 14 is axially aligned with a groove 24 provided in the bearing member 18.

Figure 1A:
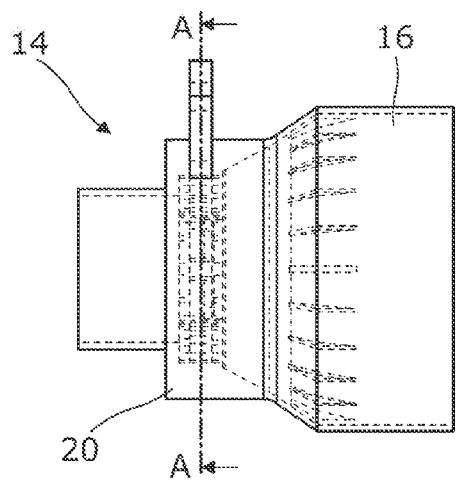
FIGS. 1A and 2A, each show a side view and FIGS. 1B and 2B, a vertical section of an end portion of a safety guard in accordance with a first embodiment of the invention with FIG. 1A showing the locking clip in the unlocked position and FIG. 2A showing the locking clip in the locked position, the vertical section shown in FIG. 1B is viewed along the line A-A of FIG. 1A and the vertical section shown in FIG. 2B is viewed along the line A'-A' of FIG. 2A.
Figure 1B:
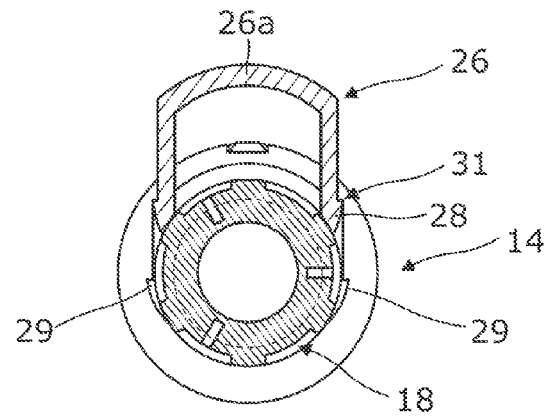

In accordance with the invention a U-shaped (or horseshoe) clip 26 is inserted into the slot 22 to engage with the groove 24 provided in the bearing member 18. The clip 26 includes a curved central portion 26a and two straight legs 26b (FIG. 3). Although the clip 26 can be fully removed, in practice the clip 26 will be moved only between the locked position (FIG. 2) and the unlocked position (FIG. 1).

Figure 2A:
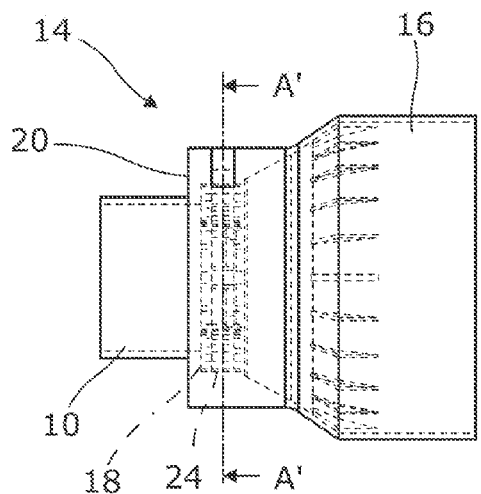
Figure 2B:
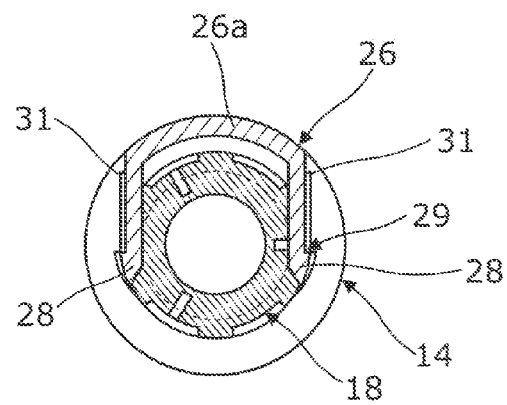

In the locked position as shown in FIG. 2, the two legs 26b are received in the groove 24 of the bearing member 18 so as to prevent axial movement of the guard 14 with respect to the PTO shaft 10. As can be seen in FIG. 2, the curvature of the central portion 26a matches that of the guard body 14 so that the clip 26 is flush with the surface of the guard body 14 when in the locked position. This reduces the risk of the clip coming into contact with a nearby object and thus avoids unintended release or damage. Tangs 28 provided at the ends of each straight leg 26b engage an edge 29 of a recess formed into an inside surface of the guard body 14 when in the locked position to inhibit radial movement of the clip 26.

When axial displacement of the guard 14 with respect to the shaft 10 is required (for example to replace a broken shear bolt in the coupling mechanism) the tangs 28 are pushed radially inwardly by a screwdriver or the like to disengage from the edges 29, access to the tangs 28 being provided through access apertures (not shown) provided in the sides of the guard body 14. The clip 26 is then manipulated radially out from the slot 22 into the unlocked position as shown in FIG. 1. In the unlocked position tangs 28 may engage a lip 31 moulded into the guard body 14 so as to prevent total removal of the clip 26. Advantageously, this reduces the risk of losing the clip 26 in the working environment.

In a not-illustrated embodiment, the flexible tang locking arrangement may be reversed wherein the tangs are instead provided on the bearing member 18, and wherein the tangs engage an edge provided on the locking clip 26.

For completeness of description, a length of chain 30 is attached to each of the guard members 14,15 and connected to a fixed structure on a tractor linkage or implement for example. The chain 30 serves to prevent rotation of the guard 14,15 during operation of the PTO.

In a second embodiment illustrated in FIGS. 6A, 6B, 7A and 7B, an alternative means of retaining the locking clip is provided. A guard member 114 includes an enlarged end portion 116 in a similar manner to the embodiment described above. A U-shaped locking clip 126 is inserted into a rectangular slot 122 and is slideably received in an annular groove in a nylon bearing member 118 provided on the PTO shaft 110.

The clip 126 includes a curved central portion 126a and two straight legs 126b (FIG. 6). At the end of each leg 126b a U-shaped clip 140, 142 is moulded into the structure of the locking clip 126. In the centre of the inside circumference of curved central portion 126a is provided a third U-shaped clip 144, again moulded into the structure of the locking clip 126. Each U-shaped clip 140,142,144 is deformable and snap fits onto a respective pin 150,152,154 moulded into the structure of the guard member 114 by application of sufficient force.

Advantageously, an additional tool is not required to remove clip 126 which is simply held in place by the clamping effect on the respective pins 150,152,154. The locking clip 126 can be removed simply by pulling on the central portion 126a with a sufficient force.

The U-shaped clip 26, 126 in accordance with the invention provides a cheap and simple alternative to known locking mechanisms for PTO safety guards. Although described in relation to a PTO shaft of an agricultural machine, it should be understood that the advantages of the invention can be delivered for a safety guard for other rotational shafts in other applications.

The invention claimed is:

1. A safety guard for a power take off shaft comprising:
   a guard body for positioning over the PTO shaft; and
   a U-shaped locking clip being slidable in a radial direction with respect to the PTO shaft between a locked position and an unlocked position;
   the locking clip comprising;
      a pair of locking portions that each extend into an annular groove present on the PTO shaft or present on a guard bearing member mounted to the PTO shaft when the locking member is in the locked position to prevent axial displacement of the guard body relative to the PTO shaft; wherein the locking clip is retained by at least one deformable clamp-type clip which snap-fits onto a respective pin fixed to the guard body.

2. The safety guard according to claim 1, wherein the guard body comprises a slot which receives the locking clip.

3. The safety guard according to claim 1, wherein the slot includes a recessed edge.

4. The safety guard according to claim 1, wherein the locking clip comprises said at least one deformable clamp-type clip.

5. The safety guard according to claim 4, wherein a clamp-type clip is disposed on each of the two straight leg portions and the curved central portion.

6. The safety guard according to claim 1, wherein the locking clip comprises a curved central portion and two straight leg portions, each leg portion comprising a respective locking portion.

7. The safety guard according to claim 6, wherein the central portion of the locking clip has a curvature which substantially matches the exterior profile of the guard body so that the outside surface of the locking clip is flush therewith when in the locked position.

* * * * *